(12) United States Patent
Yamamoto

(10) Patent No.: US 12,600,571 B2
(45) Date of Patent: Apr. 14, 2026

(54) RAINWATER STORAGE DEVICE AND CONSTRUCTION METHOD THEREOF

(71) Applicant: YAMAMOTO FOUNDATION WORKS CO., LTD., Yamanashi (JP)

(72) Inventor: Takekazu Yamamoto, Yamanashi (JP)

(73) Assignee: YAMAMOTO FOUNDATION WORKS CO., LTD., Yamanashi (JP)

( * ) Notice: Subject to any disclaimer, the term of this patent is extended or adjusted under 35 U.S.C. 154(b) by 215 days.

(21) Appl. No.: 18/240,002

(22) Filed: Aug. 30, 2023

(65) Prior Publication Data

US 2024/0246767 A1 Jul. 25, 2024

(30) Foreign Application Priority Data

Jan. 24, 2023 (JP) ................................. 2023-008714

(51) Int. Cl.
*E03F 1/00* (2006.01)
*B65G 5/00* (2006.01)
(52) U.S. Cl.
CPC ................ *B65G 5/00* (2013.01); *E03F 1/002* (2013.01)
(58) Field of Classification Search
CPC ...... B65G 5/00; E03F 3/02; E03F 5/10; E03F 1/00; E03F 1/002; E03B 3/02; E03B 3/03
See application file for complete search history.

(56) References Cited

U.S. PATENT DOCUMENTS

2015/0368892 A1* 12/2015 Gorjan ..................... B65G 5/00
405/59

FOREIGN PATENT DOCUMENTS

| | | | |
|---|---|---|---|
| DE | 20207819 | * | 11/2002 |
| EP | 2940222 | * | 11/2015 |
| JP | 8-41973 | | 2/1996 |
| JP | 2000282506 | * | 10/2000 |
| JP | 2005-240507 | | 9/2005 |
| JP | 2011-174317 | | 9/2011 |
| KR | 200430582 | * | 11/2006 |
| KR | 10-0653866 | | 12/2006 |
| KR | 10-2016-0036697 | | 4/2016 |
| TW | 201407019 | | 2/2014 |

OTHER PUBLICATIONS

Office Action issued Nov. 25, 2024 in counterpart Korean Patent Application.: 10-2023-0101365 with English translation.
Office Action issued Dec. 7, 2023 in counterpart Taiwanese Patent Application.: 11221241450 with partial English translation.
Notification of Reasons for Refusal issued May 2, 2023 in corresponding Japanese Patent Application No. 2023-008714, together with machine English translation thereof.

* cited by examiner

*Primary Examiner* — Sean D Andrish
(74) *Attorney, Agent, or Firm* — Wenderoth, Lind & Ponack, L.L.P.

(57) ABSTRACT

A rainwater storage device includes a plurality of water storage pipes buried in a ground, the water storage pipes each having a rainwater inflow port on a surface of a ground; and a lower connecting pipe that connects bottom part regions of the plurality of water storage pipes. The plurality of water storage pipes is arranged in a plurality of rows and columns, extending in a longitudinal direction and a lateral direction, respectively, and the lower connecting pipe is arranged in an inclined state toward one water storage pipe out of the plurality of water storage pipes.

7 Claims, 5 Drawing Sheets

RAINWATER STORAGE DEVICE AND CONSTRUCTION METHOD THEREOF

CROSS-REFERENCE TO RELATED APPLICATION

The present disclosure claims the priority benefit, under 35 U.S.C. § 119, of Japanese Patent Application No. 2023-008714 filed on Jan. 24, 2023, which is hereby incorporated in its entirety by reference.

TECHNICAL FIELD

This application relates to a rainwater storage device that temporarily stores water flowing into the basement of a building during heavy rain and a construction method thereof.

DESCRIPTION OF THE BACKGROUND

The statements in this section only provide information on the background art related to the present disclosure and do not necessarily constitute the prior art.

In construction of buildings, a conventionally known water storage tank is constituted of steel pipes arranged in rows so as to be used as an earth retaining wall and as a device for storing rainwater as disclosed in Japanese Patent Application Laid-Open No. Hei. 08-041973. The water storage tank is configured in a manner where sludge contained in rainwater is deposited at the bottom part of a specific steel pipe, and the deposited sludge is pumped out to prevent the sludge from accumulating in the entire water storage tank.

SUMMARY

In the conventional water storage tank as described above, it is difficult to deposit the sludge contained in rainwater in only the specific steel pipe. A small amount of sludge flows out and accumulates in adjacent steel pipes that are connected to each other. As a result, the sludge gradually accumulates in the entire water storage tank. Furthermore, since rainwater is guided into a specific steel pipe and is then stored in other steel pipes in sequence, the water storage tank may have difficulties storing a large amount of rainwater in a short period of time.

The present invention has been made in view of the aforementioned issues, and it is an object of the present invention to provide a water storage tank including a plurality of water storage pipes having their rainwater inflow ports provided on the surface of the ground, allowing for a large amount of rainwater to be stored in a short period of time. Here, the water storage pipes are connected by a connecting pipe that is inclined in one direction so as to prevent accumulation of sludge in the entire water storage tank.

A rainwater storage device of the present disclosure includes: a plurality of water storage pipes buried in a ground, the water storage pipes each having a rainwater inflow port on a surface of a ground; and a lower connecting pipe that connects bottom part regions of the plurality of water storage pipes. The plurality of water storage pipes is arranged in a plurality of rows and columns, extending in a predefined direction as a first direction and a second direction intersecting the first direction respectively, and the lower connecting pipe is arranged in an inclined state toward one water storage pipe out of the plurality of water storage pipes.

A construction method of a rainwater storage device of the present disclosure includes bringing a low overhead clearance excavator into a narrow excavation site with a height limited workspace, pressing and burying a plurality of water storage pipes in a ground using the low overhead clearance excavator, and connecting bottom part regions of the plurality of buried water storage pipes by a lower connecting pipe that is in an inclined state.

The rainwater storage device of the present disclosure has a plurality of rainwater inflow ports that form openings at the surface of the ground, increasing the total area of the rainwater inflow ports. The rainwater also flows into the plurality of water storage pipes at the same time, so that a large amount of rainwater can be stored in a short period of time. In addition, a lower connecting pipe, which connects regions near the bottom part of the multiple water storage pipes, is inclined toward one water storage pipe. Thus, the rainwater-derived sludge that has flown into the multiple water storage pipes accumulates in the one water storage pipe through the lower connecting pipe. Consequently, accumulation of sludge in the entire water storage tank can be prevented.

The construction method of a rainwater storage device of the present disclosure makes it possible to bring a low overhead clearance excavator into a narrow excavation site with a height limited workspace such as the basement of a building. Consequently, the rainwater storage device can be constructed in the ground under a basement of a building.

BRIEF DESCRIPTION OF THE DRAWINGS

The present disclosure and many of its attendant advantages will become more readily understood by reference to the detailed description below in relation to the accompanying drawings.

DETAILED DESCRIPTION OF EMBODIMENTS

A rainwater storage device of the present disclosure will be described below on the basis of embodiments with reference to the drawings. The drawings are schematic representations of component members and peripheral members of the rainwater storage device. The actual dimensions and dimensional ratios of these members do not necessarily coincide with the dimensions and dimensional ratios on the drawings. Redundant descriptions are omitted as appropriate.

Figures 1A, 1B:
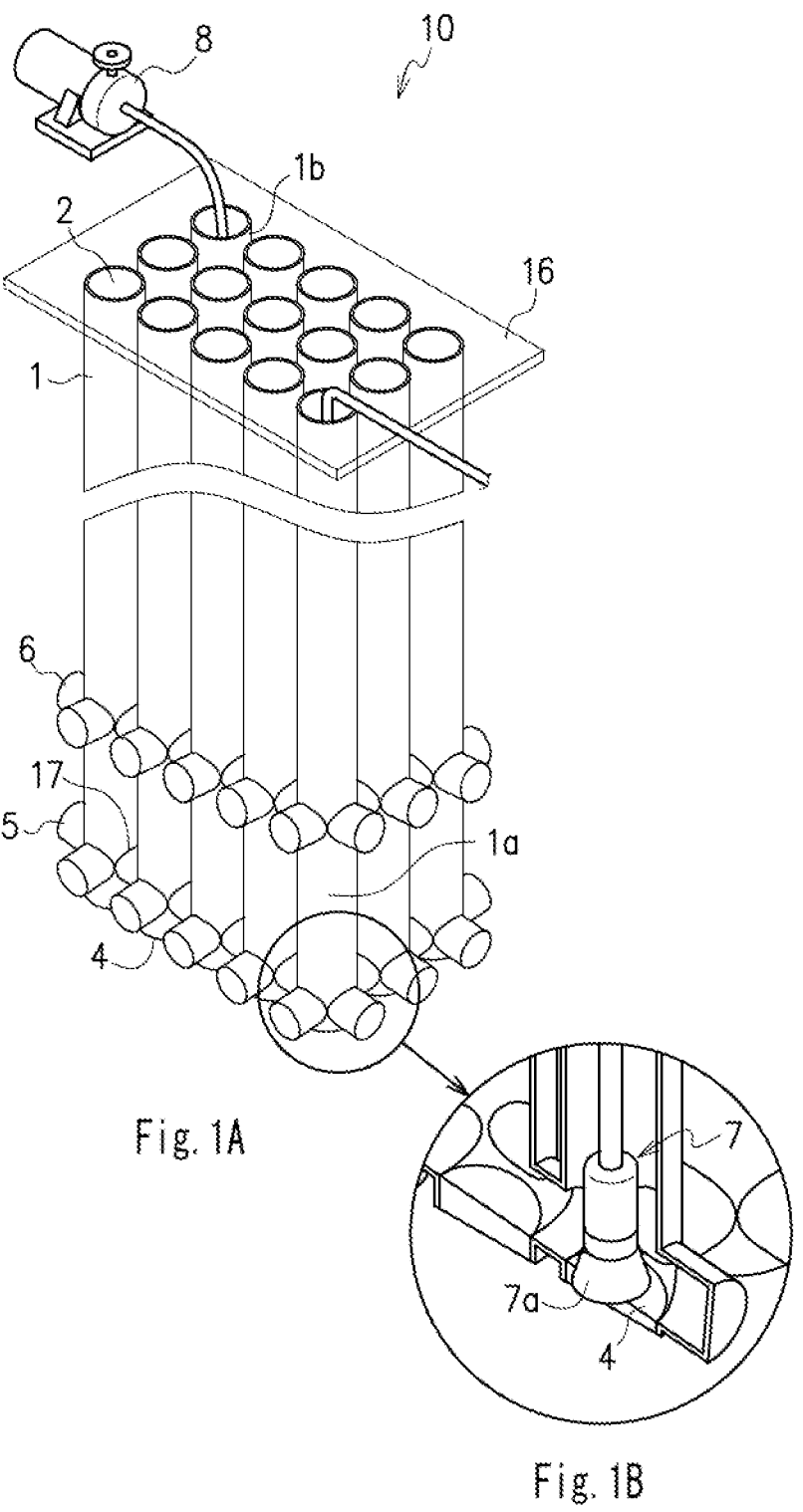
FIG. 1A is a perspective view of a rainwater storage device.
FIG. 1B is an enlarged view of a submerged sludge pump of the rainwater storage device.

In FIG. 1A, a rainwater storage device 10 is buried in the ground under the basement of an existing building (not shown) to store rainwater in steel pipes. The rainwater storage device 10 includes a plurality of water storage pipes 1 that are buried in the ground in a vertical direction to store rainwater, and lower connecting pipes 5 that connect regions near bottom parts 4 of the multiple water storage pipes 1 in an approximately horizontal direction. The water storage pipes 1 each have a rainwater inflow port 2 that opens to a ground surface 16. When rain falls, rainwater flows in through the rainwater inflow ports 2 and stored in the water storage pipes 1. The stored rainwater is discharged by operating a rainwater discharge pump 8.

The water storage pipes 1, each having a cylindrical cross-sectional shape, are placed vertically in the ground and arrayed so as to be parallel to each other. In the present embodiment, the water storage pipes 1 have a diameter large enough for personnel to enter therein for construction of peripheral equipment. Furthermore, the cross section of these pipes is set to be circular with a diameter of about 100 cm to 150 cm. The cross-sectional shape of the water storage pipes 1 is not particularly limited and may be, for example, a polygonal shape instead of a circular shape as shown in the drawings. The water storage pipes 1 may be made of a water-impermeable material to store rainwater therein, and steel pipes or resin pipes may be used as the water storage pipes 1.

The plurality of water storage pipes 1 may be installed so as to be connected in a vertical direction by a construction method using a low overhead clearance excavator 12, which will be described later. The water storage pipes 1 each have a length of about 50 cm to 100 cm. By connecting the plurality of water storage pipes 1 in the vertical direction in the ground, the length of the water storage pipes 1 may become several meters to several tens of meters. It is possible to increase the amount of water stored in the rainwater storage device 10 by connecting and installing the water storage pipes 1 in a manner where the device extends deeper into the ground.

After the water storage pipes 1 are buried in the ground, the bottom parts 4 are formed by casting concrete around the bottom of each of the water storage pipes 1 in another step described later. The bottom of the water storage pipe 1 refers to the lower end of the water storage pipe 1 when the pipe is placed in the vertical direction. When the water storage pipe 1 is constituted by vertically connecting a plurality of steel pipes, the bottom of the water storage pipe 1 refers to the lower end of the water storage pipe 1 installed deepest in the ground. The bottom part 4 formed of concrete is cast on the lower end of the water storage pipe 1 so as to block the inside of the water storage pipe 1. When the bottom part 4 is provided, the water storage pipe 1 has the shape of a bottomed container. Since the bottom part 4 and the water storage pipe 1 are formed of water-impermeable materials, rainwater does not penetrate into the soil and is stored inside the water storage pipe 1.

At the upper end of the water storage pipe 1, the rainwater inflow port 2 is provided and forms an opening at the ground surface 16. The rainwater inflow port 2 is located close to the ground surface 16 in a depth direction of the water storage pipe 1. The rainwater flowing on the ground surface 16 flows into the water storage pipe 1 through the rainwater inflow port 2. Since the plurality of rainwater inflow ports 2 is open to the ground surface 16, the total area of the rainwater inflow ports is greater compared with when there is only a single inflow port. Moreover, since rainwater simultaneously flows into the plurality of water storage pipes 1, a large amount of rainwater can be stored in a short period of time. The rainwater inflow ports 2 may each be covered with a water-permeable lid as a measure to prevent sludge contamination.

The lower connecting pipes 5 each connect the plurality of water storage pipes 1 to each other at positions near the bottom parts 4 of the water storage pipes 1 in the approximately horizontal direction. Since concrete is cast on the bottom parts 4, the lower connecting pipes 5 and the water storage pipes 1 need to be connected at positions higher than the concrete casting surfaces of the bottom parts 4. Meanwhile, since the lower connecting pipes 5 are made to move the sludge deposited on the lower side of the water storage pipes 1, it is preferable to install the lower connecting pipes 5 at as low a position as possible in the water storage pipes 1. For this reason, the lower connecting pipes 5 are installed in a manner where the inner circumferential surfaces of the lower connecting pipes 5 and the concrete casting surfaces of the bottom parts 4 are close to each other.

A cylindrical outer part of each of the lower connecting pipes 5 does not extend to the inside of the water storage pipes 1. Each lower connecting pipe 5 connects one side surface opening part 17 to the other side surface opening part 17. These side surface opening parts 17 are formed near the bottom parts 4 of the adjacent water storage pipes 1 and face each other. Therefore, the rainwater flowing in through the rainwater inflow ports 2 can also flow into the lower connecting pipes 5. Since the lower connecting pipes 5 are made of a water-impermeable material as in the case of the water storage pipes 1, the rainwater stored in the water storage pipes 1 or the sludge contained in the rainwater can move inside the lower connecting pipes 5. The water storage pipes 1 and the lower connecting pipes 5 may be fixed together by welding or by joints (not shown) at the side surface opening parts 17.

Figures 2A, 2B, 2C:
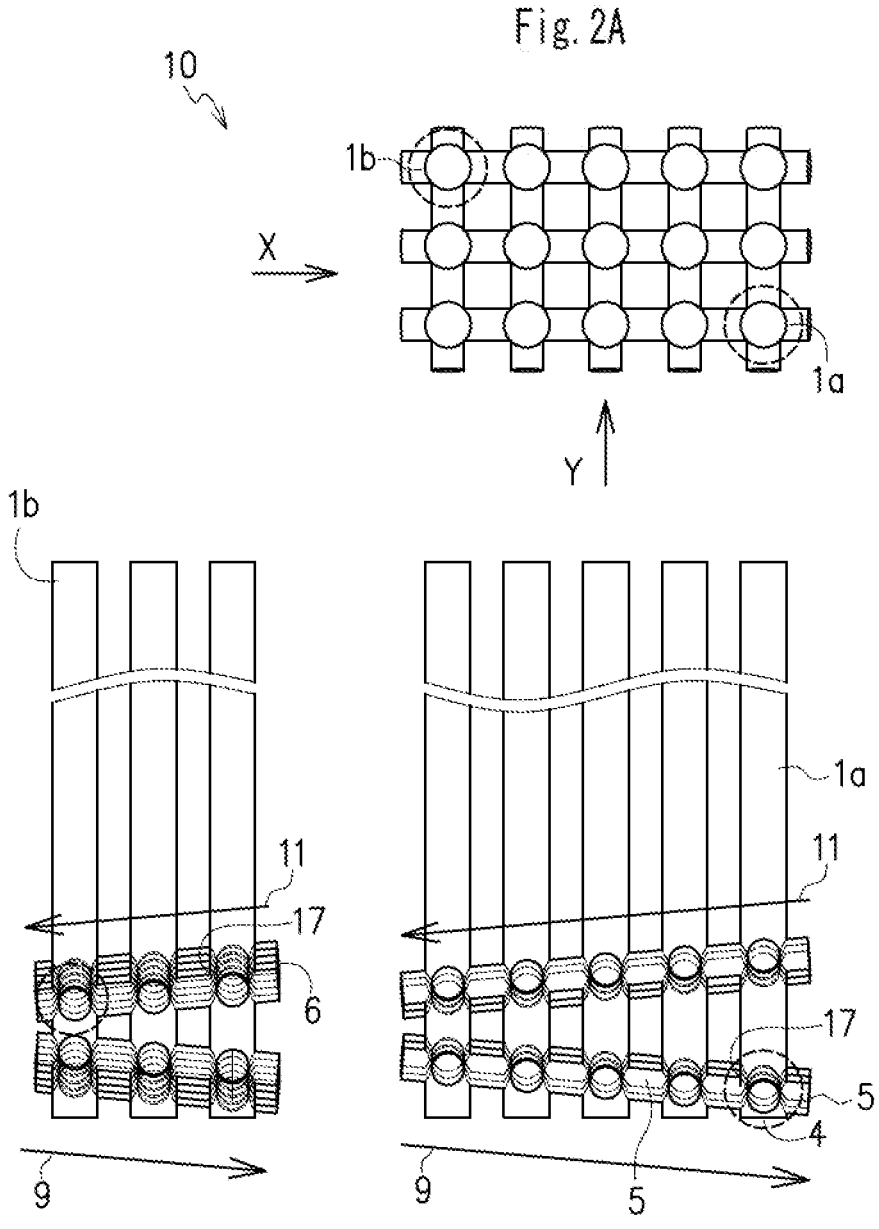
FIG. 2A is a plan view of the rainwater storage device.
FIG. 2B is a side view of the rainwater storage device as viewed from the direction of an arrow X in FIG. 2A.
FIG. 2C is a side view of the rainwater storage device as viewed from the direction of an arrow Y in FIG. 2A.

As shown in FIGS. 2A, 2B, and 2C, the side surface opening parts 17, which are openings near the bottom parts 4 of the water storage pipes 1 and are connected by the lower connecting pipes 5, are installed in the following manner. The closer the opening part 17 is to one water storage pipe 1a, installed at a corner portion, the lower the opening part 17 is positioned. Also, the farther the opening part 17 is from the one water storage pipe 1a, the higher the opening part 17 is positioned. Accordingly, the one side surface opening part 17 and the other side surface opening part 17 of the respective adjacent water storage pipes 1 face each other, and these facing side surface opening parts 17 are connected by the lower connecting pipe 5. The end part of the lower connecting pipe 5 that is closer to the one water storage pipe 1a is attached so as to be lower than the other end part that is farther from the one water storage pipe 1a.

Thus, the lower connecting pipes 5 are each attached so as to be inclined downward to the one water storage pipe 1a that is installed at one corner portion of the plurality of water storage pipes 1. Therefore, the sludge that has traveled downward through the water storage pipes 1 and has flown into the lower connecting pipes 5 also travels downward along the inclination in the lower connecting pipes 5 and concentrates in the one water storage pipe 1a.

In the present embodiment, above the lower connecting pipes 5, upper connecting pipes 6 that connect the plurality of water storage pipes 1 are provided in the approximately horizontal direction. The rainwater stored in the water storage pipes 1 is discharged out of the rainwater storage device 10 by operating the rainwater discharge pump 8. With the discharge of the rainwater, the water level in the water storage pipes 1 decreases, and the rainwater in the plurality of water storage pipes 1 flows through the lower connecting pipes 5 into a water storage pipe 1*b*. At this time, the sludge that is supposed to travel to the water storage pipe 1*a* could flow back inside the lower connecting pipes 5. The upper connecting pipes 6 function to prevent the concentration of rainwater into the lower connecting pipes 5. By providing the upper connecting pipes 6 as another rainwater travel route above the lower connecting pipes 5, the flow of rainwater into the water storage pipe 1*b* is dispersed and the backflow of the sludge is prevented.

As shown in FIGS. 2A, 2B, and 2C, there are side surface opening parts 17, of the water storage pipes 1, that are connected to the upper connecting pipes 6. These side surface opening parts 17 are installed in the following manner. The closer the side surface opening part 17 is to the water storage pipe 1*b* that is installed at a corner portion that is orthogonally distanced from the one water storage pipe 1*a*, the lower the side surface opening part 17 is positioned. Also, the farther the side surface opening part 17 is from the water storage pipe 1*b*, the higher the side surface opening part 17 is positioned. Therefore, one side surface opening part 17 and another side surface opening part 17 that faces the one side surface opening part 17 are connected by the upper connecting pipe 6, and the end part of the upper connecting pipe 6 closer to the water storage pipe 1*b* is attached so as to be lower than the end part that is farther from the water storage pipe 1*b*. As shown by an arrow 11 in FIGS. 2B and 2C, rainwater flows downward through the inclined upper connecting pipes 6 and into the water storage pipe 1*b*. A cylindrical outer part of each of the upper connecting pipes 6 does not extend to the inside of the water storage pipes 1. As a result, a small amount of sludge inside the upper connecting pipes 6 easily falls into the lower connecting pipes 5 due to the inclination.

Figure 3A:
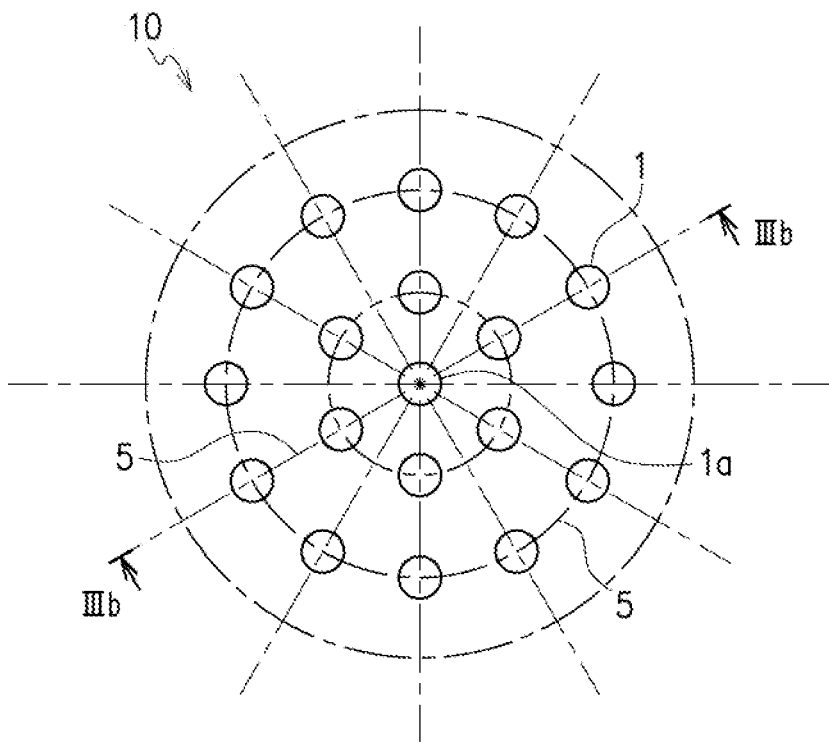
FIG. 3A is a plan view showing an example of the placement of water storage pipes of the rainwater storage device.
Figure 3B:
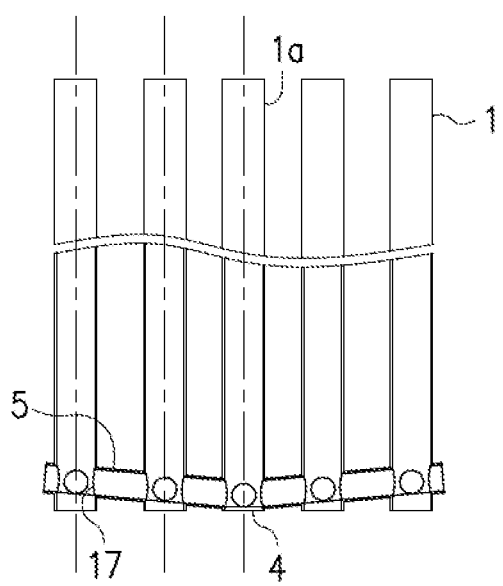
FIG. 3B is a cross-sectional view taken along IIIb-IIIb line in FIG. 3A.

As shown in FIGS. 1A, 1B, 2A, 2B, and 2C, the plurality of water storage pipes 1 is arranged in a plurality of rows and columns, extending in a predefined direction as a first direction and a second direction intersecting the first direction, respectively. In the present embodiment, the rainwater storage device 10 is an assembly of the water storage pipes 1, and as a result has an approximately rectangular shape in plan view. That is, the plurality of water storage pipes 1 is arranged in a plurality of rows in the longitudinal direction as the first direction and in a plurality of columns in the lateral direction as the second direction orthogonal to the first direction. Since the shape of the rainwater storage device 10 is not particularly limited, the rainwater storage device 10 may have a circular shape as shown in FIGS. 3A and 3B, or other shapes, for example. In the case of placing the water storage pipes 1 in a circular shape, the water storage pipes 1 are arranged radially and concentrically in a plurality of rows in some of all directions passing through the center thereof. Here, one water storage pipe 1*a* with the largest depth may be placed in the center, and only the lower connecting pipes 5 may be arranged at an angle toward the one water storage pipe 1*a*. When the one water storage pipe 1*a* is placed in the center and a submerged sludge pump 7 as shown in FIG. 1B is placed on the bottom part 4 thereof, the travel distance of the sludge inside the lower connecting pipes 5 can be shortened and clogging due to the sludge can be prevented. Note that the lower connecting pipes 5 that connect the plurality of water storage pipes 1 in a circumferential direction may connect only the outermost water storage pipes 1.

In this way, the rainwater storage device 10, which is not particularly restricted in shape, can be freely shaped according to an installation site, and therefore the plurality of water storage pipes 1 can be placed with a high density within the site. In addition, the low overhead clearance excavator 12 described later can build the rainwater storage device 10 in the basement of an existing building. With the low overhead clearance excavator 12, construction of the basement is less likely to be restricted by existing buildings, and the rainwater storage device 10 can easily control the outflow of rainwater with the water storage pipes 1 being placed in a high density in the basement.

In the rainwater storage device 10 having an approximately rectangular shape in plan view, at least the water storage pipes 1 arrayed on the outer perimeter are connected in line by the lower connecting pipes 5 and the upper connecting pipes 6. Furthermore, the water storage pipes 1 other than those on the outer perimeter are connected at least in one direction out of the longitudinal direction and the lateral direction by the lower connecting pipes 5 and the upper connecting pipes 6.

Figures 4A, 4B, 4C:
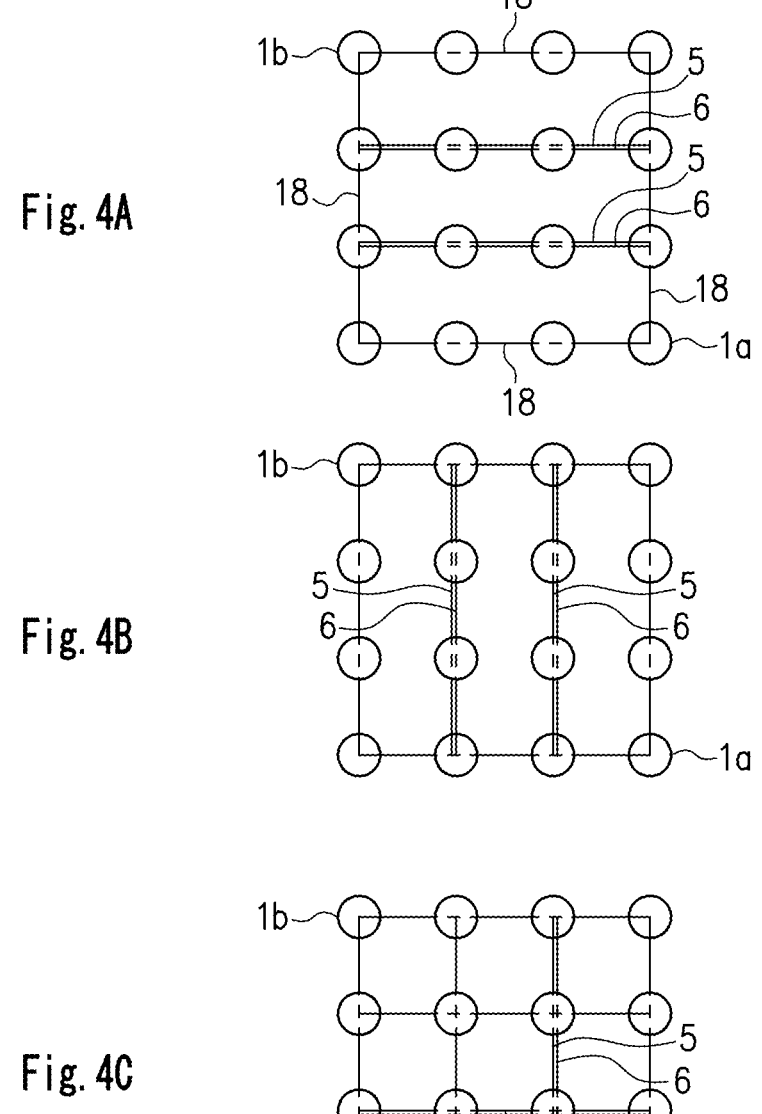
FIG. 4A is a plan view showing a lateral arrangement of lower connecting pipes and upper connecting pipes of the rainwater storage device.
FIG. 4B is a plan view showing a longitudinal arrangement of the lower connecting pipes and the upper connecting pipes of the rainwater storage device.
FIG. 4C is a plan view showing a lateral and longitudinal arrangement of the lower connecting pipes and the upper connecting pipes of the rainwater storage device.

As shown in FIGS. 4A, 4B, and 4C, the plurality of water storage pipes 1 arrayed on the outer perimeter refers to the plurality of water storage pipes 1 that forms each side 18 in a rectangular shape. In addition, being connected in line refers to a state where the lower connecting pipes 5 and the upper connecting pipes 6 that connect the water storage pipes 1 of the respective sides 18 are connected continuously over the entire perimeter.

The water storage pipes 1 other than those on the outer perimeter refer to the plurality of water storage pipes 1 placed on an inward, toward the center, relative to the water storage pipes 1 that form the respective sides 18. The longitudinal direction and the lateral direction, as described above, may include, within a plane, a first direction extending in one direction and a second direction extending in another direction orthogonal to the first direction, respectively. Furthermore, the longitudinal direction and the lateral direction also refer to the directions parallel to respective sides 18 which are orthogonal to each other. Being connected in one direction refers to a state where the lower connecting pipes 5 and the upper connecting pipes 6 connect the plurality of water storage pipes 1 in a linear and continuous manner.

For example, as shown in FIG. 4A, the water storage pipes 1 may be connected in one direction by the lower connecting pipes 5 and the upper connecting pipes 6 extending in the lateral direction. In addition, as shown in FIG. 4B, the water storage pipes 1 may be connected in one direction by the lower connecting pipes 5 and the upper connecting pipes 6 extending in the longitudinal direction. In addition, as shown in FIG. 4C, the water storage pipes 1 may be connected by the lower connecting pipes 5 and the upper connecting pipes 6 extending in a lattice shape.

As described above, the water storage pipes 1 arrayed on the outer perimeter and the water storage pipes 1 other than those on the outer perimeter are all connected to one another by the lower connecting pipes 5 and the upper connecting pipes 6, so that the rainwater and the sludge inside the rainwater storage device 10 are not restricted in movement.

As shown in FIG. 1B, the submerged sludge pump 7 is installed on the bottom part 4 of the one water storage pipe 1*a* that is installed at one corner portion of the rainwater storage device 10. As indicated by the arrow 9 in FIGS. 2B and 2C, the sludge contained in rainwater flows downward through the inclined lower connecting pipes 5 and flows into the bottom part 4 of the one water storage pipe 1*a* without having its flow be restricted. Since the submerged sludge pump 7 can collectively carry out the sludge flowing into the bottom parts 4, there is no accumulation of sludge or debris on the bottom parts 4 of the rainwater storage device 10.

As shown in FIG. 1A, the rainwater discharge pump 8 is installed in the water storage pipe 1*b* that is installed at a corner portion diagonally away from the one water storage pipe 1*a*. While the rainwater discharge pump 8 is required to discharge the rainwater at the bottom of the water storage pipe 1*b*, it is desirable to keep a suctioned amount of the rainwater-derived sludge as low as possible. As described above, the lower connecting pipe 5 is installed so that the inner circumferential surface of the lower connecting pipe 5 and the concrete casting surfaces of the bottom parts 4 are close to each other. Therefore, the bottom parts 4 of the water storage pipes 1 are provided so as to be gradually increasing in height from the water storage pipe 1*a* toward the water storage pipe 1*b*. Since the submerged sludge pump 7 and the rainwater discharge pump 8 are placed at respective corner portions diagonally away from each other, a large height difference can be provided between an intake port 7*a* of the submerged sludge pump 7 installed on the bottom part 4 and an intake port (not shown) of the rainwater discharge pump 8. As a result, the suction of sludge by the rainwater discharge pump 8 can be reduced.

In this way, the rainwater storage device 10 can store a large amount of rainwater in a short period of time, with the plurality of rainwater inflow ports 2 being provided at the ground surface. Since the bottom parts 4 of the plurality of water storage pipes 1 are connected to each other, and the submerged sludge pump 7 is provided on the bottom part 4 of the water storage pipe 1*a*, which is placed at the deepest position, it is possible for the sludge to be accumulated in one place and be discharged out of the rainwater storage device 10. As a result, accumulation of the sludge in the entire rainwater storage device 10 can be prevented. In addition, the rainwater discharge pump 8 is placed above the submerged sludge pump 7 and the rainwater discharge pump 8 and the submerged sludge pump 7 are placed diagonally away from each other in the rainwater storage device 10. Therefore, it is less likely for the rainwater discharge pump 8 to suction perturbed free-floating sludge by the submerged sludge pump 7. This effect makes maintenance over a long term no longer necessary.

Figure 5:
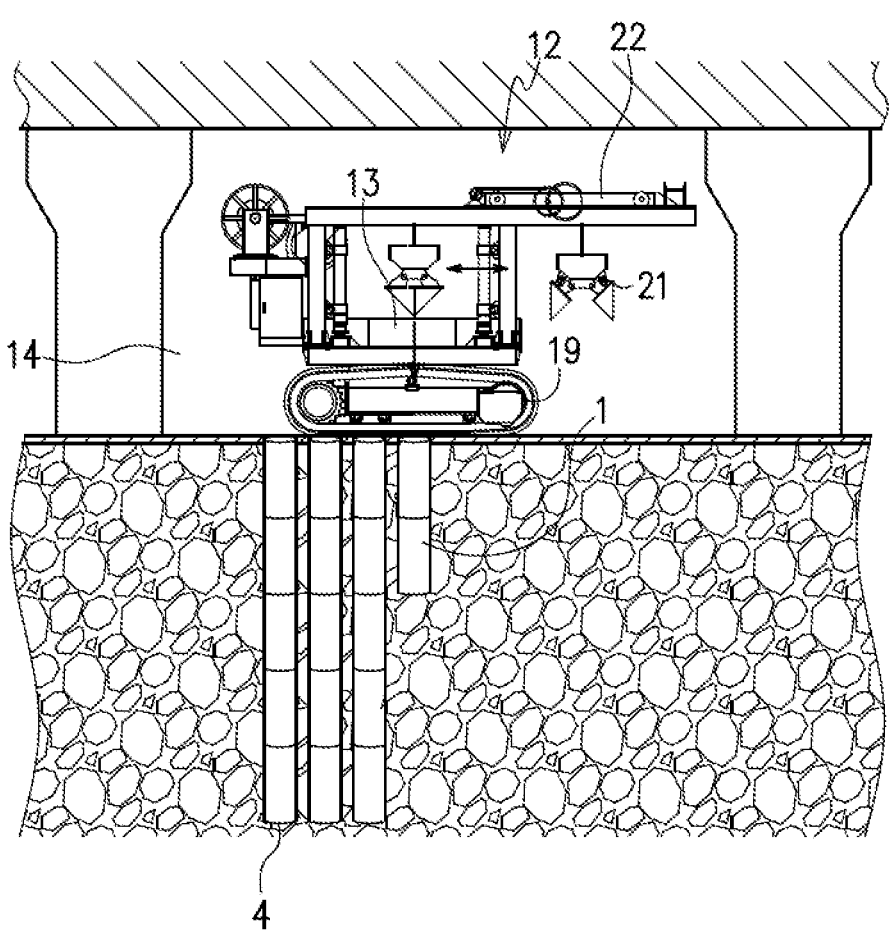
FIG. 5 is an explanatory view of the construction method of the rainwater storage device.

Next, a construction method of the rainwater storage device 10 in the ground is described. To install the rainwater storage device 10 of the present disclosure, the low overhead clearance excavator 12 shown in FIG. 5 can be used. The low overhead clearance excavator 12 includes a tubing unit 13 that rotates and presses each of the water storage pipes 1 into the ground. The low overhead clearance excavator 12 can move while the tubing unit 13 is mounted on a travel mechanism unit 19. Accordingly, even in a narrow construction site with a height limited workspace such as a foundation portion 14 of an existing building, the low overhead clearance excavator 12 can easily enter a site with a height size of about 3.5 m or more and perform burying operation of the water storage pipes 1.

The tubing unit 13 rotates and presses the water storage pipes 1 into the ground. Since the low overhead clearance excavator 12 presses the water storage pipes 1 into the ground while moving, the water storage pipes 1 can be arranged in the ground in the longitudinal direction, the lateral direction, or both. Moreover, in addition to arranging the water storage pipes 1 in the longitudinal and lateral directions, the low overhead clearance excavator 12 can also press and bury the plurality of water storage pipes 1 by sequentially adding the water storage pipes 1 in the vertical direction. When the plurality of buried water storage pipes 1 are vertically connected in the vertical direction, the water storage pipes 1 can be placed at a depth, relative to the surface, that is longer than the length of one water storage pipe 1. This makes it possible to increase the amount of water stored in the rainwater storage device 10.

Soil and sand inside the water storage pipes 1 placed in the ground are removed by using a hammer grab 21 that is opened, dropped, and then closed while being lifted. The hammer grab 21 is moved by a slide base 22 and is re-opened in a prescribed position. As a result, the sand and soil removed from the inside of the water storage pipes 1 are discharged. After the soil and sand are removed from the inside of the water storage pipe 1, concrete is cast on the bottom ends of the water storage pipes 1 to form the bottom parts 4. The water storage pipes 1 have a diameter large enough for a worker to enter for construction of the peripheral equipment. After the water storage pipes 1 are vertically placed under the ground and the bottom parts 4 are formed, the worker enters into the water storage pipes 1 and connects the water storage pipes 1 to the lower connecting pipes 5 and the upper connecting pipes 6.

Thus, with use of the low overhead clearance excavator 12 that can easily enter into a narrow construction site, such as the basement of an existing building, the rainwater storage device 10 can easily be constructed even in places where working space overhead is limited.

What is claimed is:

1. A rainwater storage device comprising:
   a plurality of water storage pipes buried in a ground, the water storage pipes each having a rainwater inflow port on a surface of the ground;
   a lower connecting pipe that connects bottom part regions of the plurality of water storage pipes to each other; and
   an upper connecting pipe that is located above the lower connecting pipe and connects the plurality of the water storage pipes to each other, wherein:
   the plurality of water storage pipes is arranged in a plurality of rows and columns, extending in a predetermined direction as a first direction and a second direction intersecting the first direction, respectively;
   the lower connecting pipe is arranged in an inclined state toward one water storage pipe out of the plurality of water storage pipes; and
   the upper connecting pipe is arranged in an inclined state toward a direction opposite an inclined direction of the lower connecting pipe.

2. The rainwater storage device according to claim 1, wherein the plurality of water storage pipes is arranged in the plurality of rows and columns, extending in a longitudinal direction as the first direction and a lateral direction as the second direction orthogonal to the first direction.

3. The rainwater storage device according to claim 2, wherein
   among the plurality of water storage pipes that is arranged in the plurality of rows and columns, extending in the longitudinal direction and the lateral direction, respectively, at least the water storage pipes arrayed on an outer perimeter are connected in line by the lower connecting pipe and the upper connecting pipe to each other, and the water storage pipes other than the water storage pipes on the outer perimeter are connected at least in one of the longitudinal and the lateral directions by the lower connecting pipe and the upper connecting pipe.

4. The rainwater storage device according to claim 2, wherein a submerged sludge pump is installed on a bottom part of the one water storage pipe among the plurality of water storage pipes that is arranged in the plurality of rows and columns, extending in the longitudinal direction and the lateral direction, respectively, the one water storage pipe being installed at one corner portion of the plurality of water storage pipes.

5. The rainwater storage device according to claim 2, wherein a submerged sludge pump is installed on a bottom part of the one water storage pipe among the plurality of water storage pipes that is arranged in the plurality of rows and columns, extending in the longitudinal direction and the lateral direction, respectively, the one water storage pipe being installed at one corner portion of the plurality of water storage pipes, and a rainwater discharge pump is installed in another of the water storage pipes that is installed at a corner portion that is on a diagonal line from the one water storage pipe.

6. The rainwater storage device according to claim 1, wherein the plurality of water storage pipes is buried in the ground corresponding to a basement of a building.

7. The rainwater storage device according to claim 1, wherein each of the plurality of water storage pipes is formed by connecting a plurality of pipes that are pressed into the ground using an excavator.

\* \* \* \* \*